United States Patent
Mihara et al.

(10) Patent No.: US 7,434,834 B2
(45) Date of Patent: Oct. 14, 2008

(54) OCCUPANT PROTECTION SYSTEM FOR VEHICLE

(75) Inventors: Takashi Mihara, Niwa-gun (JP); Yukiyasu Ueno, Nishio (JP)

(73) Assignee: Denso Corporation, Kariya (JP)

( * ) Notice: Subject to any disclaimer, the term of this patent is extended or adjusted under 35 U.S.C. 154(b) by 419 days.

(21) Appl. No.: 11/019,444

(22) Filed: Dec. 23, 2004

(65) Prior Publication Data

US 2005/0200105 A1 Sep. 15, 2005

(30) Foreign Application Priority Data

Mar. 10, 2004 (JP) ............................. 2004-067585

(51) Int. Cl.
*B60R 21/16* (2006.01)
(52) U.S. Cl. ...................... 280/735; 180/282
(58) Field of Classification Search ................. 280/735; 180/274, 282
See application file for complete search history.

(56) References Cited

U.S. PATENT DOCUMENTS

| | | | | |
|---|---|---|---|---|
| 5,202,831 A | * | 4/1993 | Blackburn et al. | 701/46 |
| 5,389,824 A | * | 2/1995 | Moroto et al. | 307/10.1 |
| 6,113,138 A | * | 9/2000 | Hermann et al. | 280/735 |
| 6,196,578 B1 | * | 3/2001 | Iyoda | 280/735 |
| 6,196,579 B1 | * | 3/2001 | Bowers et al. | 280/735 |
| 6,594,570 B2 | | 7/2003 | Nagao et al. | |
| 6,666,292 B2 | * | 12/2003 | Takagi et al. | 180/274 |
| 2004/0066022 A1 | | 4/2004 | Mori et al. | |
| 2004/0182629 A1 | * | 9/2004 | Takahashi et al. | 180/274 |

* cited by examiner

*Primary Examiner*—Eric Culbreth
(74) *Attorney, Agent, or Firm*—Posz Law Group, PLC

(57) ABSTRACT

An object of the invention is to provide an occupant protection system for a vehicle, in which an erroneous determination for a rear crash can be avoided. An output signal from an acceleration sensor for a front crash as well as an output signal from a back sonar sensor is also inputted to an electronic control unit (ECU), in addition to an output signal from a main rear crash sensor. Then, the ECU finally determines that a rear crash has occurred, only when the ECU respectively determines the rear crash from each of output signals from the main rear crash sensor, the front crash acceleration sensor and the back sonar sensor.

5 Claims, 2 Drawing Sheets

OCCUPANT PROTECTION SYSTEM FOR VEHICLE

CROSS REFERENCE TO RELATED APPLICATION

This application is based on Japanese Patent Application No. 2004-67585 filed on Mar. 10, 2004, the disclosures of which is incorporated herein by reference.

FIELD OF THE INVENTION

The present invention relates to an occupant protection system for a vehicle, in particular an occupant protection system when a rear vehicle crashes against a front vehicle at its rear end.

BACKGROUND OF THE INVENTION

It is known in the art that a pretension device of a seat belt and/or air-bag system for a rear crash is operated when the rear vehicle crashes against the front vehicle, as disclosed in Japanese Patent Publications Nos. 2002-283949 and 2004-058850.

In the prior art system, a rear crash has been detected by one acceleration sensor assembled in an electronic control unit (ECU). And therefore, the rear crash may be erroneously detected and thereby an erroneous operation of the pretension device and/or the rear crash air-bag may happen to occur.

SUMMARY OF THE INVENTION

Accordingly, the present invention is made in view of the above problems. It is an object of the present invention to provide an occupant protection system for a vehicle, in which an erroneous detection of a rear crash can be suppressed.

According to a feature of the first embodiment of the present invention, an occupant protection system comprises a first and a second acceleration sensor for respectively detecting an acceleration of the vehicle in its longitudinal direction. The occupant protection system further comprises an electronic control unit, which has a rear crash detecting means for determining a rear crash, when the rear crash detecting means respectively determines that a rear crash has occurred based on each of output signals from first and second acceleration sensors. And the occupant protection system finally controls an occupant protection device for a seat belt, an unlock device for a vehicle door system, an air-bag device for the rear crash, and so on.

According to another feature of the present invention, the above first acceleration sensor is assembled in the electronic control unit, and the second acceleration sensor is provided in the vehicle but outside of the electronic control unit.

Furthermore, the above second acceleration sensor can be an acceleration sensor provided at a front side of the vehicle for detecting a front crash.

According to a further feature of the second embodiment of the present invention, an occupant protection system comprises a first acceleration sensor for detecting an acceleration of the vehicle in its longitudinal direction and a rear vehicle recognition means provided at a rear side of the vehicle for recognizing a rear vehicle. The system further comprises an electronic control unit which has a rear crash detecting means for determining a rear crash, when the rear crash detecting means respectively determines that a rear crash has occurred based on each of output signals from first acceleration sensor and from the rear vehicle recognition means.

The above rear vehicle recognition means can be a vehicle distance detecting means for detecting a distance between the vehicle and the rear vehicle by a millimeter wave radar or a laser radar.

The above rear vehicle recognition means can be further an image recognition device for recognizing an image of the rear vehicle, and for detecting a distance between the vehicle and the rear vehicle, by processing the images recognized by an image sensor.

The above rear vehicle recognition means can be furthermore a back sonar sensor for detecting a distance between the vehicle and the rear vehicle, by sending out a sonic wave in a backward direction of the vehicle and receiving a reflected sonic wave.

In the above second embodiment of the present invention, a second acceleration sensor can be further provided to detect the acceleration of the vehicle in its longitudinal direction. And the above first acceleration sensor is assembled in the electronic control unit, and the second acceleration sensor is provided in the vehicle but outside of the electronic control unit.

Furthermore, the above second acceleration sensor can be an acceleration sensor provided at a front side of the vehicle for detecting a front crash.

According to a further feature of the invention, the occupant protection device can be a pretension device for a seat belt, an unlock device for a vehicle door lock system, and/or an air-bag device of the rear crash

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
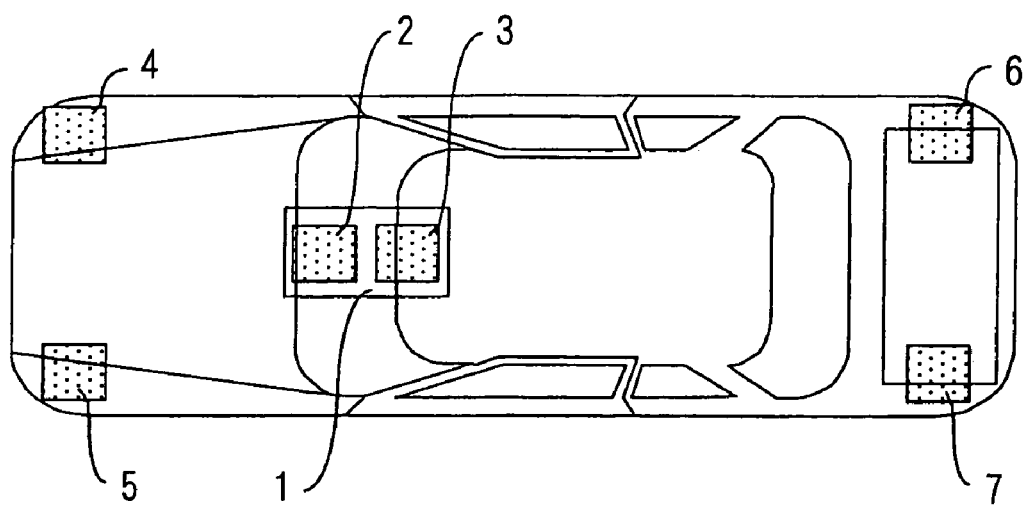
FIG. 1 is a schematic view showing a vehicle in which arrangements of various kinds of sensors are indicated.

An embodiment of the present invention is explained with reference to FIG. 1. An occupant protection system comprises an electronic control unit (ECU) 1, a right-hand side front sensor 4, a left-hand side front sensor 5, a right-hand side back vehicle recognition means 6, a left-hand side back vehicle recognition means 7, a pretension device for a seatbelt (not shown), an unlock device for a door lock system, and an air bag device for a rear crash. In this embodiment, the right-hand side back vehicle recognition means 6 and the left-hand side back vehicle recognition means 7 are both sonar sensors.

The ECU 1 is positioned at almost a center of a vehicle and has a main acceleration sensor 2 and a control portion 3, in which the sensor 2 detects acceleration in a longitudinal direction of the vehicle. The right-hand side and the left-hand side front sensors 4 and 5 are respectively positioned at a right-hand and a left-hand front sides of the vehicle, to detect the acceleration in the longitudinal direction of the vehicle. The front sensors 4 and 5 can also detect a front crash.

The above acceleration sensors 2, 4, and 5 are connected to the control portion 3 of the ECU 1 to apply detected signals to the control portion 3. The ECU 1 is connected to a vehicle battery (not shown).

The back vehicle recognition means 6, 7 are respectively positioned at the right-hand and left-hand rear sides of the vehicle. In this embodiment, the positioning allows the back vehicle recognition means 6, 7 to send out sonic wave in a backward direction of the vehicle. The back vehicle recognition means 6, 7 in this embodiment then receive any reflected sonic wave, which is reflected at any obstacles behind the vehicle.

Accordingly, when there is another vehicle following the vehicle (rear vehicle), the back vehicle recognition means 6, 7 in this embodiment receive the reflected sonic wave and detect an existence of the rear vehicle when the rear vehicle is following the (front) vehicle within a predetermined distance. The back vehicle recognition means 6, 7 are so arranged in this embodiment that they output signals so long as the rear vehicle remains in an area having the predetermined distance from the front vehicle. And therefore, in case of a rear crash, the back vehicle recognition means 6, 7 in this embodiment keep their output signals from a time point at which the rear vehicle comes in the area of the predetermined distance from the front vehicle to a time point of the crash.

The above back vehicle recognition means 6, 7 are connected to the control portion 3 to apply detected output signals to the control portion 3.

As above, the back vehicle recognition means 6, 7 constitute a rear vehicle recognition means for detecting the distance between the front vehicle and the rear vehicle and outputting a signal indicating the detected distance.

Since the pretension device for the seat belt, the unlock device of the door lock system and the air-bag device for the rear crash are well known devices, the explanation thereof is omitted.

Figure 2:
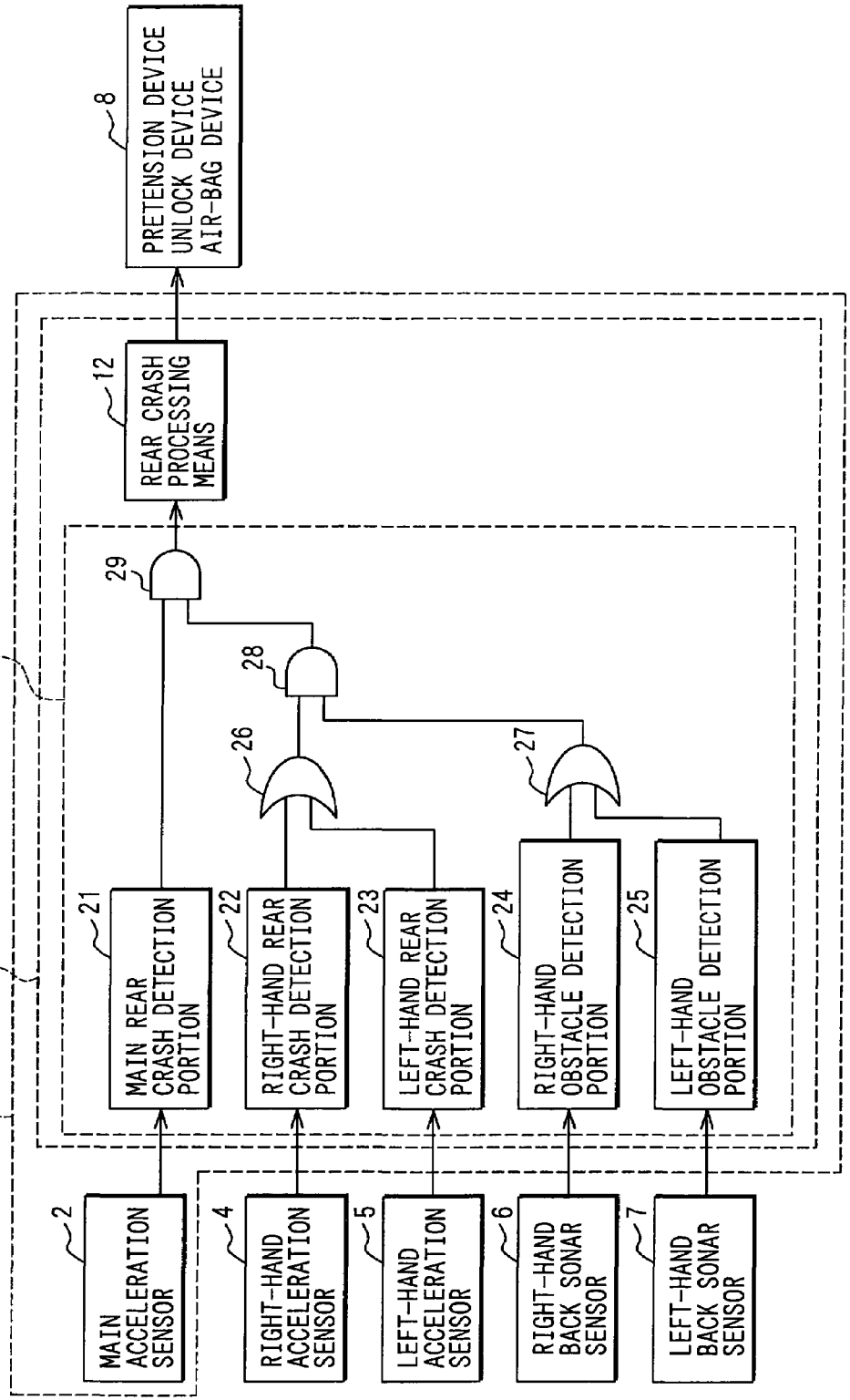
FIG. 2 is a block diagram showing a system structure of the invention

A structure and operation of the control portion 3 of the ECU 1 is explained with reference to FIG. 2, which is a block diagram showing the system structure of the present invention.

The control portion 3 of the ECU 1 comprises a main rear crash detecting means 11 and a rear crash processing means 12, wherein the main rear crash detecting means 11 comprises a main rear crash detection portion 21, a right-hand rear crash detection portion 22, a left-hand rear crash detection portion 23, a right-hand obstacle detection portion 24, a left-hand obstacle detection portion 25, a first OR circuit 26, a second OR circuit 27, a first AND circuit 28 and a second AND circuit 29.

An output signal from the main acceleration sensor 2 is inputted to the main rear crash detection portion 21, at which an integration of the output signal is performed for a predetermined time period.

Then, the integrated value is compared with a predetermined negative threshold level, and it is determined that the rear vehicle has crashed against the front vehicle when the integrated value is larger than the predetermined negative threshold level. If it is the case, the main rear crash detection portion 21 outputs a main rear crash signal.

Each of output signals from the right-hand side and left-hand side front sensors 4 and 5 is respectively inputted to the right-hand and left-hand rear crash detection portions 22 and 23, at which an integration of the respective output signals are likewise performed for a predetermined time period.

Then, each of the integrated values is respectively compared with a predetermined negative threshold level, and it is determined that the rear vehicle has crashed against the front vehicle when the integrated value is larger than the predetermined negative threshold level. When the occurrence of the rear crash is determined at any of the detection portions 22 and 23, the corresponding right-hand and/or left-hand rear crash detection portions 22 and 23 output rear crash detection signals.

Each of output signals (output information) from the right-hand side and left-hand side back vehicle recognition means 6 and 7 is respectively inputted to the right-hand and left-hand obstacle detection portions 24 and 25.

A fact that the output signals are inputted from the vehicle recognition means 6 and/or 7 to the detection portions 24 and/or 25 means that there is an obstacle, such as the rear vehicle, behind the front vehicle and within the area of the predetermined distance from the front vehicle.

It is determined from the output signals (output information) whether the rear vehicle has crashed against the front vehicle. When it is so determined, the right-hand and/or left-hand obstacle detection portions 24 and/or 25 output(s) rear crash detection signals.

Each of the detection signals from the right-hand and left-hand rear crash detection portions 22 and 23 is inputted to the first OR circuit 26, so that the first OR circuit 26 outputs a first rear crash signal when it receives at least either one of the rear crash detection signals from the rear crash detection portions 22 and 23.

As in the same manner, each of the detection signals from the right-hand and left-hand obstacle detection portions 24 and 25 is inputted to the second OR circuit 27, so that the second OR circuit 27 outputs a second rear crash signal when it receives at least either one of the rear crash detection signals from the obstacle detection portions 24 and 25.

Since output sides of the first and second OR circuits 26 and 27 are connected to the first AND circuit 28, it outputs an auxiliary rear crash signal when it receives the first and second rear crash signals from the first and second OR circuits 26 and 27 at the same time.

Further, since an output side of the main rear crash detection portion 21 and an output side of the first AND circuit 28 are connected to the second AND circuit 29, it outputs a final rear crash signal when it receives the main rear crash signal from the main detection portion 21 and the auxiliary rear crash signal from the first AND circuit 28 at the same time.

As in the above embodiment, the second AND circuit 29 outputs its final rear crash signal when the flowing three conditions are met at the same time:

First condition: the main detection portion 21 determines that the rear crash has occurred;

Second condition: either one of the right-hand or left-hand rear crash detection portion 22 or 23 determines that the rear crash has occurred; and Third condition: either one of the right-hand or left-hand obstacle detection portion 24 or 25 determines that the rear crash has occurred.

The rear crash processing means 12 outputs rear crash control signals to an occupant protection device 8, which comprises the pretension device for a seatbelt, the unlock device for the door lock system and the air-bag device for the rear crash.

The rear crash control signals mean an operational signal for the pretension device, an operational signal for the unlock device and an operational signal for the air-bag device.

As above, since the rear crash is determined only when the above three conditions are met at the same time, an erroneous determination of the rear crash can be avoided, even when one or some of the elements 2, 4, 5, 6, 7 may erroneously detect the rear crash.

Compared with a prior art, in which the rear crash is detected and determined based on a signal from one acceleration sensor, the rear crash is determined based on signals from multiple sensors, according to the present invention. Accordingly, the erroneous determination of the rear crash can be suppressed, and thereby an erroneous operation of the pretension device and/or the air-bag device can be avoided.

As in the above embodiment, the first acceleration sensor 2 is provided in the ECU 1, while the second sensors 4, 5 are provided at different positions of the vehicle from the first sensor 2. Since those sensors 2, 4, 5 can detect accelerations at different points of the vehicle, erroneous operation (detection) of those sensors at the same time can be prevented. Furthermore, since those different sensors can be avoided from being affected by the same noise, the possible erroneous detection of the acceleration at the different sensors due to the noises can be avoided.

Furthermore, since the second acceleration sensor (4, 5) can be an acceleration sensor provided at a front side of the vehicle for detecting a front crash, it is not necessary to provide a new additional acceleration sensor for the purpose of the present invention. As a result, cost down for the system can be achieved.

OTHER EMBODIMENTS

Although, in the above embodiment, the rear crash is determined only when the above three conditions are met, the ECU 1 can be, however, so arranged that it determines the rear crash when two of those three conditions, preferably the first and second conditions or the first and the third conditions, are met.

Even according to the above modification, the erroneous detection and determination of the rear crash can be avoided, as in the first embodiment, because the rear crash is likewise determined based on signals from the multiple sensors. Accordingly, an erroneous operation of the pretension device and/or the air-bag device can be likewise avoided.

In the above embodiment, sonar sensors form the rear vehicle recognition means 6, 7. Instead of the back sonar sensors, however, image recognition devices can be used as the rear vehicle recognition means 6, 7. In such a case, the image recognition device comprises an image recognition sensor for recognizing an image of the rear vehicle, and an image processing means for processing the image information to determine a distance between the front and rear vehicles, so that it detects the rear crash.

When the image recognition device is used as the rear vehicle recognition means 6, 7, the image recognition device is so arranged that it generates an output signal so long as the rear vehicle is in the area of the predetermined distance from the front vehicle.

The above rear vehicle recognition means can be furthermore a vehicle distance detecting means for detecting a distance between the vehicle and the rear vehicle by a millimeter wave radar or a laser radar.

According to any kinds of the rear recognition means mentioned above, an existence of the rear vehicle can be surely detected and a fact that the rear vehicle is coming closer to the front vehicle can be also easily detected.

What is claimed is:

1. An occupant protection system for a vehicle, comprising:
    an occupant protection device provided in the vehicle;
    a first acceleration sensor provided in the vehicle for detecting an acceleration of the vehicle in a longitudinal direction of the vehicle, to generate a first acceleration signal corresponding to detected acceleration;
    a rear vehicle recognition means provided at a rear side of the vehicle for recognizing a rear vehicle, to generate a recognition signal corresponding to a recognized condition; and
    an electronic control unit provided in the vehicle and having a rear crash detecting means for determining a rear crash,
    wherein the electronic control unit comprises;
        a first rear crash detection portion for receiving the first acceleration signal from the first acceleration sensor and outputting a first rear crash signal, when the first rear crash detection portion determines that a rear crash has occurred based on the first acceleration signal from the first acceleration sensor,
        an obstacle detection portion for receiving the recognition signal from the rear vehicle recognition means and outputting a second rear crash signal, when the obstacle detection portion determines that a rear crash has occurred based on the recognition signal from the rear vehicle recognition means, and
        a rear crash processing means for receiving the first and second rear crash signals and outputting a control signal to the occupant protection device, only when both of the first and second rear crash signals are outputted at the same time to the rear crash processing means, and
    wherein the rear vehicle recognition means comprises a vehicle distance detecting means for detecting a distance between the vehicle and the rear vehicle and outputting an output signal indicating the detected distance.

2. An occupant protection system according to claim 1, wherein the rear vehicle recognition means comprises:
    an image recognition means for recognizing an image of the rear vehicle; and
    an image processing means for detecting a distance between the vehicle and the rear vehicle, by processing the images recognized by the image recognition means;
    wherein the rear vehicle recognition means outputs an output signal indicating the detected distance based on the image processing.

3. An occupant protection system for a vehicle, comprising:
    an occupant protection device provided in the vehicle;
    a first acceleration sensor provided in the vehicle for detecting an acceleration of the vehicle in a longitudinal direction of the vehicle, to generate a first acceleration signal corresponding to detected acceleration;
    a rear vehicle recognition means provided at a rear side of the vehicle for recognizing a rear vehicle, to generate a recognition signal corresponding to a recognized condition; and
    an electronic control unit provided in the vehicle and having a rear crash detecting means for determining a rear crash,
    wherein the electronic control unit comprises;
        a first rear crash detection portion for receiving the first acceleration signal from the first acceleration sensor and outputting a first rear crash signal, when the first rear crash detection portion determines that a rear crash has occurred based on the first acceleration signal from the first acceleration sensor,
        an obstacle detection portion for receiving the recognition signal from the rear vehicle recognition means and outputting a second rear crash signal, when the obstacle detection portion determines that a rear crash has occurred based on the recognition signal from the rear vehicle recognition means, and
        a rear crash processing means for receiving the first and second rear crash signals and outputting a control signal to the occupant protection device, only when both of the first and second rear crash signals are outputted at the same time to the rear crash processing means, wherein the rear vehicle recognition means comprises a back sonar sensor for detecting a distance between the vehicle and the rear vehicle, by sending out a sonic wave in a backward direction of the vehicle and receiving a reflected sonic wave, and wherein the rear vehicle recognition means outputs an output signal indicating the detected distance based on the reflected sonic wave.

4. An occupant protection system for a vehicle, comprising:

an occupant protection device provided in a vehicle;

a first sensor provided in the vehicle for generating a first detection signal corresponding to a first detected crash metric;

a second sensor provided in the vehicle for generating a second detection signal corresponding to a second detected crash metric;

a first rear crash detection portion for making a first determination whether a rear crash has occurred based on the first detection signal, and generating a first rear crash signal if the first determination is that the rear crash has occurred;

a second rear crash detection portion for making a second determination whether the rear crash has occurred based on the second detection signal, and generating a second rear crash signal if the second determination is that the rear crash has occurred; and a rear crash processing means for receiving the first and second rear crash signals, and generating a control signal to the occupant protection device indicating that the rear crash has occurred based on the first and second rear crash signals, wherein the rear crash processing means generates the control signal only when it receives both the first and second rear crash signals, wherein the first sensor is an acceleration sensor, wherein the first detected crash metric is a detected acceleration in a longitudinal direction of the vehicle, wherein the second sensor is a rear vehicle recognition means, wherein the second detected crash metric is a recognition signal corresponding to a recognized condition, and wherein the rear vehicle recognition means comprises a vehicle distance detecting means for detecting a distance between the vehicle and the rear vehicle and outputting an output signal indicating the detected distance.

5. An occupant protection system for a vehicle, comprising:

an occupant protection device provided in a vehicle;

a first sensor provided in the vehicle for generating a first detection signal corresponding to a first detected crash metric;

a second sensor provided in the vehicle for generating a second detection signal corresponding to a second detected crash metric;

a first rear crash detection portion for making a first determination whether a rear crash has occurred based on the first detection signal, and generating a first rear crash signal if the first determination is that the rear crash has occurred;

a second rear crash detection portion for making a second determination whether the rear crash has occurred based on the second detection signal, and generating a second rear crash signal if the second determination is that the rear crash has occurred;

a rear crash processing means for receiving the first and second rear crash signals, and generating a control signal to the occupant protection device indicating that the rear crash has occurred based on the first and second rear crash signals;

a third sensor provided in the vehicle for generating a third detection signal corresponding to a third detected crash metric; and a third rear crash detection portion for making a third determination whether the rear crash has occurred based on the third detection signal, and generating a third rear crash signal if the third determination is that the rear crash has occurred, wherein the rear crash processing means generates the control signal only when it receives both the first and second rear crash signals, wherein the rear crash processing means receives the first, second, and third rear crash signals, and generates the control signal based on the first, second, and third rear crash signals, wherein the rear crash processing means generates the control signal only when it receives all of the first, second, and third rear crash signals, wherein the first sensor is a first acceleration sensor, wherein the first detected crash metric is a first detected acceleration in a longitudinal direction of the vehicle, wherein the second sensor is a second acceleration sensor, wherein the second detected crash metric is a second detected acceleration in the longitudinal direction of the vehicle, wherein the third sensor is a rear vehicle recognition means, wherein the third detected crash metric is a recognition signal corresponding to a recognized condition, and wherein the rear vehicle recognition means comprises a vehicle distance detecting means for detecting a distance between the vehicle and the rear vehicle and outputting an output signal indicating the detected distance.

* * * * *